United States Patent
Shieh et al.

(10) Patent No.: US 10,296,798 B2
(45) Date of Patent: May 21, 2019

(54) SYSTEM AND METHOD OF SELECTING A KEYFRAME FOR ITERATIVE CLOSEST POINT

(71) Applicants: NCKU Research and Development Foundation, Tainan (TW); Himax Technologies Limited, Tainan (TW)

(72) Inventors: Ming-Der Shieh, Tainan (TW); Chun-Wei Chen, Tainan (TW); Ting-Yu Lin, Tainan (TW); Der-Wei Yang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 37 days.

(21) Appl. No.: 15/705,000

(22) Filed: Sep. 14, 2017

(65) Prior Publication Data

US 2019/0080190 A1 Mar. 14, 2019

(51) Int. Cl.
- *G06K 9/00* (2006.01)
- *G06K 9/03* (2006.01)
- *G06T 7/73* (2017.01)

(52) U.S. Cl.
CPC ........... *G06K 9/03* (2013.01); *G06K 9/00744* (2013.01); *G06K 9/00993* (2013.01); *G06T 7/74* (2017.01); *G06T 2207/10016* (2013.01); *G06T 2207/10024* (2013.01); *G06T 2207/10028* (2013.01)

(58) Field of Classification Search
USPC ........................................................ 382/103
See application file for complete search history.

(56) References Cited

U.S. PATENT DOCUMENTS

| | | | | |
|---|---|---|---|---|
| 6,970,591 | B1* | 11/2005 | Lyons | G06K 9/209 345/419 |
| 2007/0263000 | A1* | 11/2007 | Krupnik | G06K 9/20 345/473 |
| 2012/0194644 | A1* | 8/2012 | Newcombe | G06T 7/74 348/46 |
| 2014/0085429 | A1* | 3/2014 | Hebert | G01S 5/163 348/46 |
| 2015/0035820 | A1* | 2/2015 | Le | G06T 17/00 345/419 |
| 2015/0278582 | A1* | 10/2015 | Petyushko | G06K 9/00261 382/118 |
| 2016/0331278 | A1* | 11/2016 | Sabiston | G01B 11/2513 |
| 2017/0094245 | A1* | 3/2017 | Barakat | G01S 3/00 |
| 2017/0278231 | A1* | 9/2017 | Narasimha | H04N 17/002 |
| 2018/0005015 | A1* | 1/2018 | Hou | G01S 17/023 |
| 2018/0082435 | A1* | 3/2018 | Whelan | G06T 7/579 |
| 2018/0139416 | A1* | 5/2018 | Hirasawa | G08B 25/00 |
| 2018/0198984 | A1* | 7/2018 | Palma | H04N 5/23222 |
| 2018/0218513 | A1* | 8/2018 | Ho | G06T 7/73 |
| 2018/0341263 | A1* | 11/2018 | Rust | G05D 1/0212 |

* cited by examiner

*Primary Examiner* — Jerome Grant, II

(74) *Attorney, Agent, or Firm* — Donald E. Stout; Stout, Uxa & Buyan, LLP

(57) ABSTRACT

A system of selecting a keyframe for iterative closest point (ICP) includes a reference frame selector that generates a reference frame according to a current frame and a current keyframe; an ICP loop unit that performs ICP on the reference frame and the current frame, thereby generating a pose of the current frame; and a keyframe update unit that generates a new keyframe according to an offset condition between the pose of the current frame and a pose of the reference frame.

15 Claims, 3 Drawing Sheets

SYSTEM AND METHOD OF SELECTING A KEYFRAME FOR ITERATIVE CLOSEST POINT

BACKGROUND OF THE INVENTION

1. Field of the Invention

The present invention generally relates to visual odometry, and more particularly to a system and method of selecting a keyframe for iterative closest point (ICP).

2. Description of Related Art

Visual odometry is a process adopted in robotics and computer vision to determine position and orientation of a robot by analyzing associated camera images, for example, captured by a RGB-D camera. The motion of the robot may be estimated by aligning a source to a target RGB-D frame using an iterative closest point (ICP) method. FIG. 1 shows a block diagram illustrated of a conventional visual odometry system 100 using ICP as disclosed in "Fast Visual Odometry Using Intensity-Assisted Iterative Closest Point," entitled to Shile Li et al., July 2016, IEEE ROBOTICS AND AUTOMATION LETTERS, VOL. 1, NO. 2, the disclosure of which is incorporated herein by reference.

The visual odometry system 100 is proposed to reduce computational cost, and reduce influence of outliers and noises. In the visual odometry system 100 of FIG. 1, salient point selection 11 is performed on the source frame, where points that provide valuable information for ICP are selected. The search of correspondences 12 is performed, where the matching point is determined. Weighting of corresponding pairs 13 is performed based on robust static. Incremental transformation 14 is performed to minimize the distances between the established correspondences. The above operations 11-14 are performed iteratively until the incremental transformation is smaller than a threshold or the maximum allowable iteration number has reached.

Conventional frame-to-frame alignment method inherently accumulates drift, because there is always a small error caused by sensor noise in the estimate. In order to overcome the drift problem, Christian Kerl et al. discloses "Dense Visual SLAM for RGB-D Cameras," 2013, Proc. of the Int. Conf. on Intelligent Robot Systems (IROS), the disclosure of which is incorporated herein by reference. Keyframe-based pose simultaneous localization and mapping (SLAM) method is adopted herein to limit local drift by estimating transformation between the current image and a keyframe. As long as the camera stays close enough to the keyframe, no drift is accumulated. The SLAM system needs to additionally perform keyframe selection, loop closure detection and validation, and map optimization.

In the conventional methods, a new keyframe is generated when a current image can no longer be matched against the latest keyframe. However, as a keyframe is selected after transformation of a current frame and the latest keyframe has been determined, keyframes with large error are likely generated, resulting in substantial tracking loss. A need has thus arisen to propose a novel scheme for preventing selecting keyframes with large error.

SUMMARY OF THE INVENTION

In view of the foregoing, it is an object of the embodiment of the present invention to provide a system and method of selecting a keyframe with fewer errors for iterative closest point (ICP) adaptable to constructing or updating a map of an unknown environment while simultaneously keeping track of an agent's location within it.

According to one embodiment, a system of selecting a keyframe for iterative closest point (ICP) includes a reference frame selector, an ICP loop unit and a keyframe update unit. The reference frame selector generates a reference frame according to a current frame and a current keyframe. The ICP loop unit performs ICP on the reference frame and the current frame, thereby generating a pose of the current frame. The keyframe update unit generates a new keyframe according to an offset condition between the pose of the current frame and a pose of the reference frame.

DETAILED DESCRIPTION OF THE INVENTION

Figure 1:
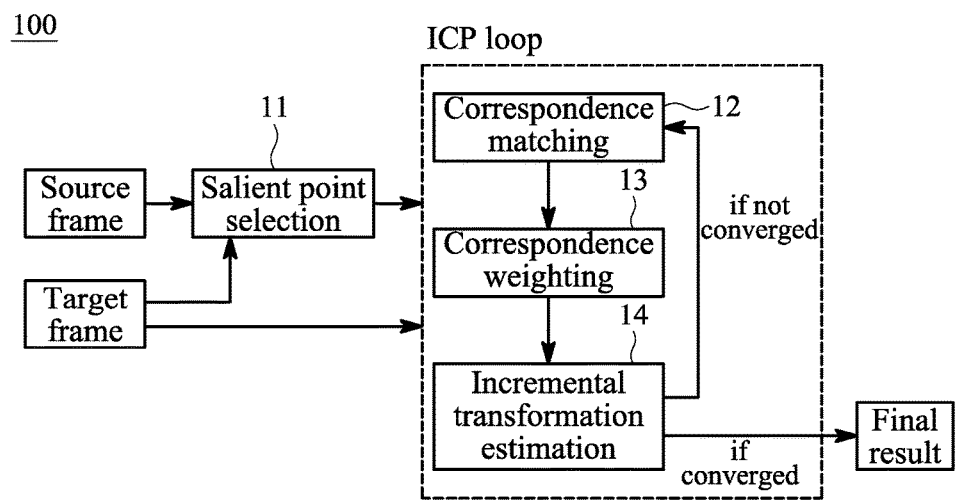
FIG. 1 shows a block diagram illustrated of a conventional visual odometry system using ICP.
Figure 2:
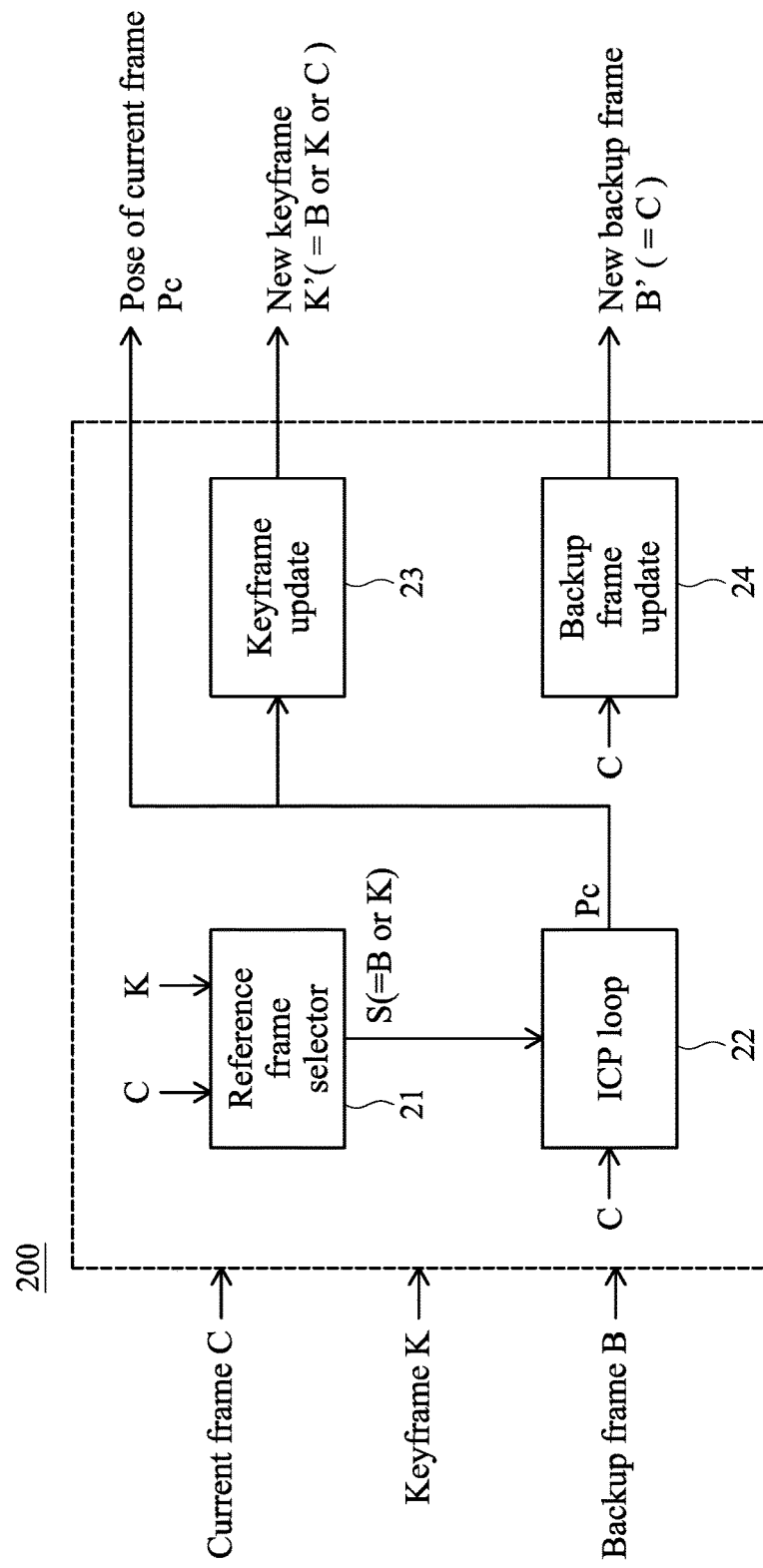
FIG. 2 shows a block diagram illustrated of a system of selecting a keyframe for iterative closest point (ICP) according to one embodiment of the present invention.

FIG. 2 shows a block diagram illustrated of a system 200 of selecting a keyframe for iterative closest point (ICP) according to one embodiment of the present invention. ICP is a method generally employed to minimize difference between two clouds of points. The system 200 of the embodiment may, for example, be adaptable to simultaneous localization and mapping (SLAM), which is utilized, e.g., in robotic mapping and navigation, to construct or update a map of an unknown environment while simultaneously keeping track of an agent's location within it.

The blocks of the system 200 may be implemented by electrical circuits, computer software or their combination. For example, at least a portion of the system 200 may be performed in a digital image processor. As another example, at least a portion of the system 200 may be implemented by an instructions-controlled computer. In one exemplary embodiment, the system 200 may be adapted to an augmented reality (AR) device. Hardware components for the AR device may primarily include a processor (e.g., an image processor), a display (e.g., head-mounted display) and sensors (e.g., a color-depth camera such as RGB-D camera for red, green, blue plus depth). Specifically, the sensors or camera captures scenes to generate image frames (or simply frames), which are then fed to the processor that performs the operations of the system 200. Augmented reality is then rendered in the display.

In the embodiment, the system 200 may include a reference frame selector 21 that is configured to generate a reference frame S according to a current frame C and a current keyframe K. The current frame C may be provided, for example, by a camera such as a RGB-D camera.

Figure 3:
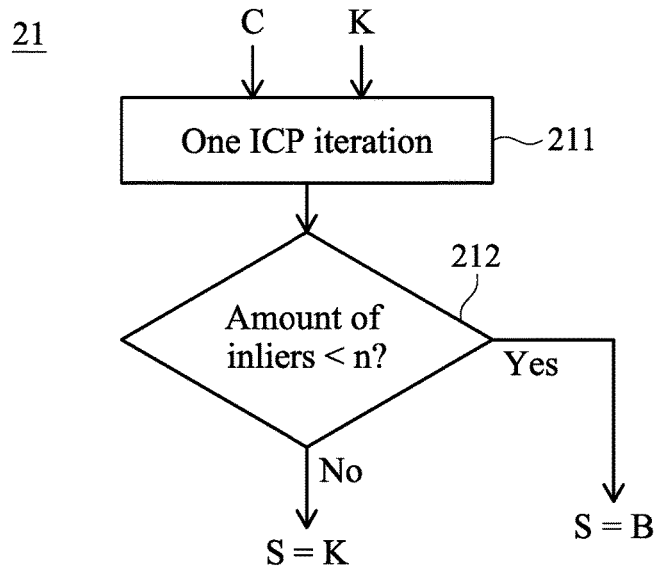
FIG. 3 shows a flow diagram illustrated of the reference frame selector of FIG. 2.

FIG. 3 shows a flow diagram illustrated of the reference frame selector 21 of FIG. 2. Specifically, in step 211, at least one ICP iteration is performed on the current frame C and the current keyframe K. In the embodiment, only one ICP iteration is performed on the current frame C and the current keyframe K. Details of ICP operation may be referred to aforementioned "Fast Visual Odometry Using Intensity-Assisted Iterative Closest Point" and "Dense Visual SLAM for RGB-D Cameras." Further, details of ICP may be referred to "Multiview Registration for Large Data Sets," entitled to Kari Pulli, October 1999, Second International Conference on 3D Digital Imaging and Modeling; and "Tracking a Depth Camera: Parameter Exploration for Fast ICP," entitled to Francois Pomerleau et al., September 2011, IEEE/RSJ International Conference on Intelligent Robots and Systems, the disclosures of which are incorporated herein by reference.

Subsequently, in step 212, if an amount of inliers from a result of the performed ICP iteration is less than a predetermined value n (indicating that matching quality fails to reach a predetermined level), a current backup frame B is selected as the reference frame (i.e., S=B); otherwise the current keyframe K is selected as the reference frame (i.e., S=K). Conclusively speaking, if the current frame C is not substantially aligned to the current keyframe K (alternatively speaking, matching quality thereof fails to reach a predetermined level), the current backup frame B is used in the following ICP operation; otherwise the current keyframe K is kept for the following ICP operation.

To be more elaborate, in the embodiment, a pair of matched points is considered an inlier if its Euclidean distance falls within the percentage set of matching distances. Higher number of inliers is equivalent to higher matching quality, and vice versa. In the embodiment, the current backup frame B is a previous frame that has been temporarily stored in a storage such as a buffer.

The system 200 of the embodiment may include an ICP loop unit 22 that is configured to perform ICP on the reference frame S (outputted from the reference frame selector 21) and the current frame C. Accordingly, the ICP loop unit 22 generates, among others, a pose (i.e., location and orientation) of the current frame Pc and an error value. Detailed operations of the ICP loop unit 22 may be referred to the references mentioned above.

Figure 4:
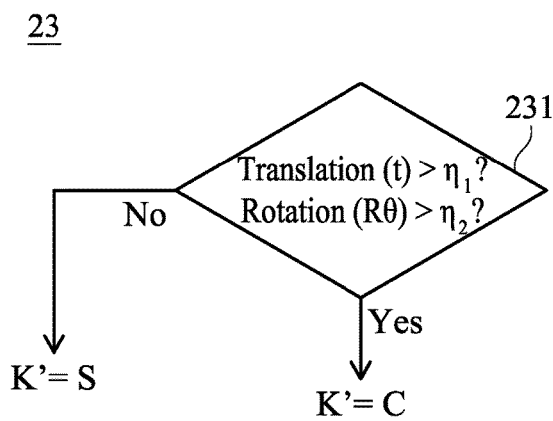
FIG. 4 shows a flow diagram illustrated of the keyframe update unit of FIG. 2 according to one embodiment of the present invention.

The system 200 of the embodiment may include a keyframe update unit 23 that is configured to generate a new keyframe K' according to offset (or difference) between the pose of the current frame Pc and a pose of the reference frame Ps. FIG. 4 shows a flow diagram illustrated of the keyframe update unit 23 of FIG. 2 according to one embodiment of the present invention. Specifically, in step 231, an offset condition between the pose of the current frame Pc and a pose of the reference frame Ps is determined. The offset condition of the embodiment may be expressed as follows:

Translation $(t) > \eta_1$

Rotation $(R\theta) > \eta_2$ where t represents translation, θ represents rotation, R represents depth distance, and $\eta_1$ and $\eta_2$ are predetermined offset thresholds.

If the offset condition is satisfied (indicating that the current frame is no longer matched against the latest keyframe K), the current frame C is designated as the new keyframe K' (i.e., K'=C); otherwise the reference frame S is designated as the new keyframe K' (i.e., K'=S).

It is noted that the offset condition in step 231 includes two sub-conditions: (1) translation and (2) rotation. In one exemplary embodiment, offset condition is satisfied when at least one of the sub-conditions is satisfied. In another exemplary embodiment, offset condition is satisfied when both two sub-conditions are satisfied.

According to one aspect of the embodiment, the rotation sub-condition (i.e., Rotation $(R\theta) > \theta_2$) is carried out according to both depth R and rotation angle θ. The rationale for considering both depth R and rotation angle θ is that points with the same rotation angle θ but different depths feel or experience different extents of motion. That is, extents of closeness between points with different depths are different.

The system 200 of the embodiment may include a backup frame update unit 24 that is configured to provide a new backup frame B'. In the embodiment, the backup frame update unit 24 may include a storage, such as a buffer, that is configured to temporarily store the current frame as a new backup frame B' for the next ICP iteration.

Although specific embodiments have been illustrated and described, it will be appreciated by those skilled in the art that various modifications may be made without departing from the scope of the present invention, which is intended to be limited solely by the appended claims.

What is claimed is:

1. A system of selecting a keyframe for iterative closest point (ICP), comprising:
   a reference frame selector that selects a current backup frame or a current keyframe as a reference frame according to a current frame and the current keyframe;
   an ICP loop unit that performs ICP on the reference frame and the current frame, thereby generating a pose of the current frame; and
   a keyframe update unit that generates a new keyframe according to an offset condition between the pose of the current frame and a pose of the reference frame;
   wherein the reference frame selector performs the following steps:
      performing at least one ICP iteration on the current frame and the current keyframe; and
      if matching quality of the performed ICP iteration fails to reach a predetermined level, selecting the current backup frame as the reference frame, otherwise selecting the current keyframe as the reference frame.

2. The system of claim 1, wherein the current frame is provided by a red, green, blue plus depth (RGB-D) camera.

3. The system of claim 1, wherein the matching quality of the performed ICP iteration fails to reach the predetermined level when an amount of inliers from a result of the performed ICP iteration is less than a predetermined value.

4. The system of claim 1, wherein the current backup frame is a previous frame that has been temporarily stored.

5. The system of claim 1, wherein the offset condition comprises translation, rotation and depth distance between the pose of the current frame and the pose of the reference frame.

6. The system of claim 5, wherein the offset condition comprises:
   a translation sub-condition: Translation $(t) > \eta 1$;
   a rotation sub-condition: Rotation $(R\theta) > \eta 2$;
   where t represents translation, θ represents rotation, R represents depth distance, and η1 and η2 are predetermined offset thresholds.

7. The system of claim 6, wherein if at least one sub-condition is satisfied, the current frame is designated as the new keyframe, otherwise the reference frame is designated as the new keyframe.

8. The system of claim 1, further comprising a backup frame update unit that provides a new backup frame according to the current frame.

9. The system of claim 8, wherein the backup frame update unit comprises a storage that temporarily stores the current frame as the new backup frame for a next ICP iteration.

10. A method of selecting a keyframe for iterative closest point (ICP), comprising:
    generating a reference frame according to a current frame and a current keyframe;
    performing ICP on the reference frame and the current frame, thereby generating a pose of the current frame; and
    generating a new keyframe according to an offset condition between the pose of the current frame and a pose of the reference frame;
    wherein the step of generating the reference frame comprises the following steps:
        performing at least one ICP iteration on the current frame and the current keyframe; and
        if matching quality of the performed ICP iteration fails to reach a predetermined level, selecting a current backup frame as the reference frame, otherwise selecting the current keyframe as the reference frame.

11. The method of claim 10, wherein the matching quality of the performed ICP iteration fails to reach the predetermined level when an amount of inliers from a result of the performed ICP iteration is less than a predetermined value.

12. The method of claim 10, wherein the current backup frame is a previous frame that has been temporarily stored.

13. The method of claim 10, wherein the offset condition comprises translation, rotation and depth distance between the pose of the current frame and the pose of the reference frame.

14. The method of claim 13, wherein the offset condition comprises:
    a translation sub-condition: Translation $(t) > \eta 1$;
    a rotation sub-condition: Rotation $(R\theta) > \eta 2$;
    where t represents translation, $\theta$ represents rotation, R represents depth distance, and $\eta 1$ and $\eta 2$ are predetermined offset thresholds.

15. The method of claim 14, wherein if at least one sub-condition is satisfied, the current frame is designated as the new keyframe, otherwise the reference frame is designated as the new keyframe.

\* \* \* \* \*